(12) United States Patent
Cassoni

(10) Patent No.: US 7,604,245 B2
(45) Date of Patent: Oct. 20, 2009

(54) MOUNTABLE ACTUATING DEVICE FOR MOTORIZED VEHICLES

(76) Inventor: Robert P. Cassoni, 2366 Wymore Pl., Centerville, OH (US) 45459

( * ) Notice: Subject to any disclaimer, the term of this patent is extended or adjusted under 35 U.S.C. 154(b) by 561 days.

(21) Appl. No.: 10/799,799

(22) Filed: Mar. 12, 2004

(65) Prior Publication Data
US 2004/0173993 A1  Sep. 9, 2004

Related U.S. Application Data

(62) Division of application No. 10/159,634, filed on May 31, 2002, now Pat. No. 6,705,624.

(60) Provisional application No. 60/364,554, filed on Mar. 15, 2002.

(51) Int. Cl.
*B62B 1/14* (2006.01)
(52) U.S. Cl. ................................. 280/47.131
(58) Field of Classification Search ............ 280/47.131, 280/47.17, 47.24, 402, 492, DIG. 5, DIG. 6; 414/462, 607, 24.5; 224/274, 282; 172/7, 172/443, 456
See application file for complete search history.

(56) References Cited

U.S. PATENT DOCUMENTS

| | | | | |
|---|---|---|---|---|
| 2,338,955 A | * | 1/1944 | Metcalf | 414/462 |
| 2,822,969 A | * | 2/1958 | Cooper | 224/42.32 |
| 3,237,968 A | * | 3/1966 | Arsenault | 280/492 |
| 4,061,257 A | | 12/1977 | St. Clair | 224/42.08 |
| 4,306,825 A | * | 12/1981 | Yilit | 414/24.5 |
| 4,337,882 A | * | 7/1982 | Hampton | 224/519 |
| 4,341,059 A | * | 7/1982 | Gerzanich | 56/15.8 |
| 4,355,746 A | * | 10/1982 | Casady | 224/274 |
| 4,402,367 A | * | 9/1983 | Couser | 172/456 |
| 4,461,413 A | * | 7/1984 | Hoerner | 224/493 |
| 4,613,271 A | | 9/1986 | Naab | 414/303 |
| 4,892,158 A | * | 1/1990 | Brown et al. | 172/443 |
| 4,906,039 A | * | 3/1990 | Broman | 296/37.6 |
| 5,145,308 A | * | 9/1992 | Vaughn et al. | 414/462 |
| 5,165,840 A | * | 11/1992 | McKinney | 414/607 |
| 5,472,084 A | | 12/1995 | Aliano, Jr. | 206/315.3 |
| 5,482,304 A | | 1/1996 | Smith | 280/315.3 |
| 5,567,107 A | * | 10/1996 | Bruno et al. | 414/462 |
| 5,620,197 A | * | 4/1997 | Howes | 280/402 |
| 6,007,031 A | | 12/1999 | Tang | 248/96 |

(Continued)

FOREIGN PATENT DOCUMENTS

JP     10155954 A  *  6/1998

OTHER PUBLICATIONS

Translation of previously disclosed Japanese Patent Application JP 10-155954, filed Nov. 28, 1996 (12 pages).

*Primary Examiner*—Lesley D Morris
*Assistant Examiner*—Daniel Yeagley
(74) *Attorney, Agent, or Firm*—Davidson, Davidson & Kappel, LLC

(57) ABSTRACT

A mountable actuating device for motorized vehicles includes a frame, a first hitching device and a second hitching device movable with respect to the frame, a first actuator connected to the frame for moving the first hitching device between a first position and a second position, and a second actuator connected to the frame for moving the second hitching device with respect to the frame between a third position and a fourth position.

13 Claims, 19 Drawing Sheets

U.S. PATENT DOCUMENTS

| | | | |
|---|---|---|---|
| 6,086,312 A * | 7/2000 | Ziaylek et al. | 414/462 |
| 6,193,256 B1 | 2/2001 | Banary, Jr. | 280/400 |
| 6,230,817 B1 * | 5/2001 | Haugen | 172/7 |
| 6,238,171 B1 | 5/2001 | Carter | 414/563 |
| 6,361,264 B1 | 3/2002 | Guthrie et al. | 224/521 |
| 6,478,203 B2 | 11/2002 | Burns | 224/510 |
| 6,715,774 B2 | 4/2004 | Cassoni | 280/47.131 |
| 6,739,604 B2 | 5/2004 | Cassoni | 280/47.131 |
| 2004/0188984 A1 | 9/2004 | Cassoni | 280/652 |

* cited by examiner

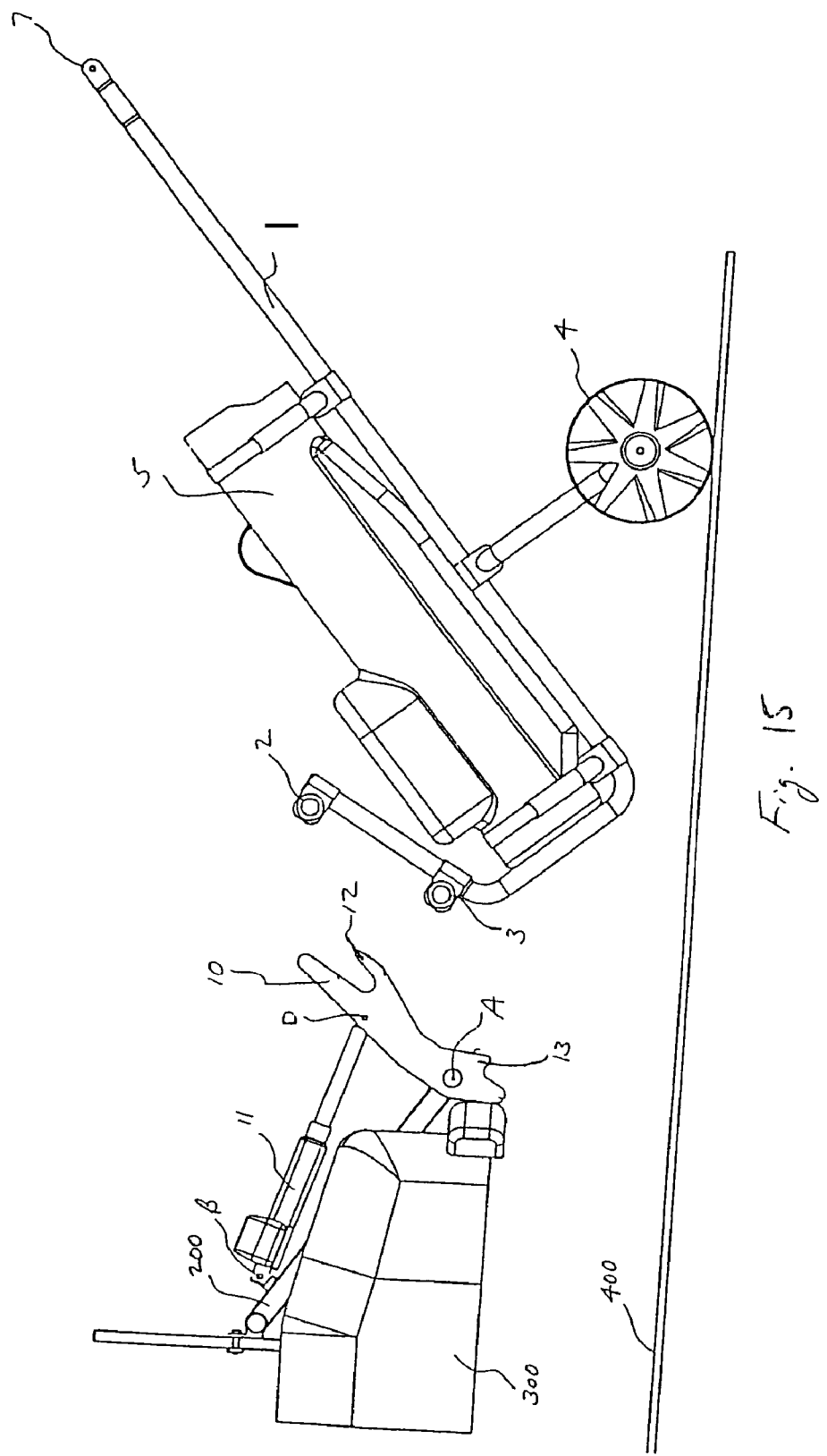

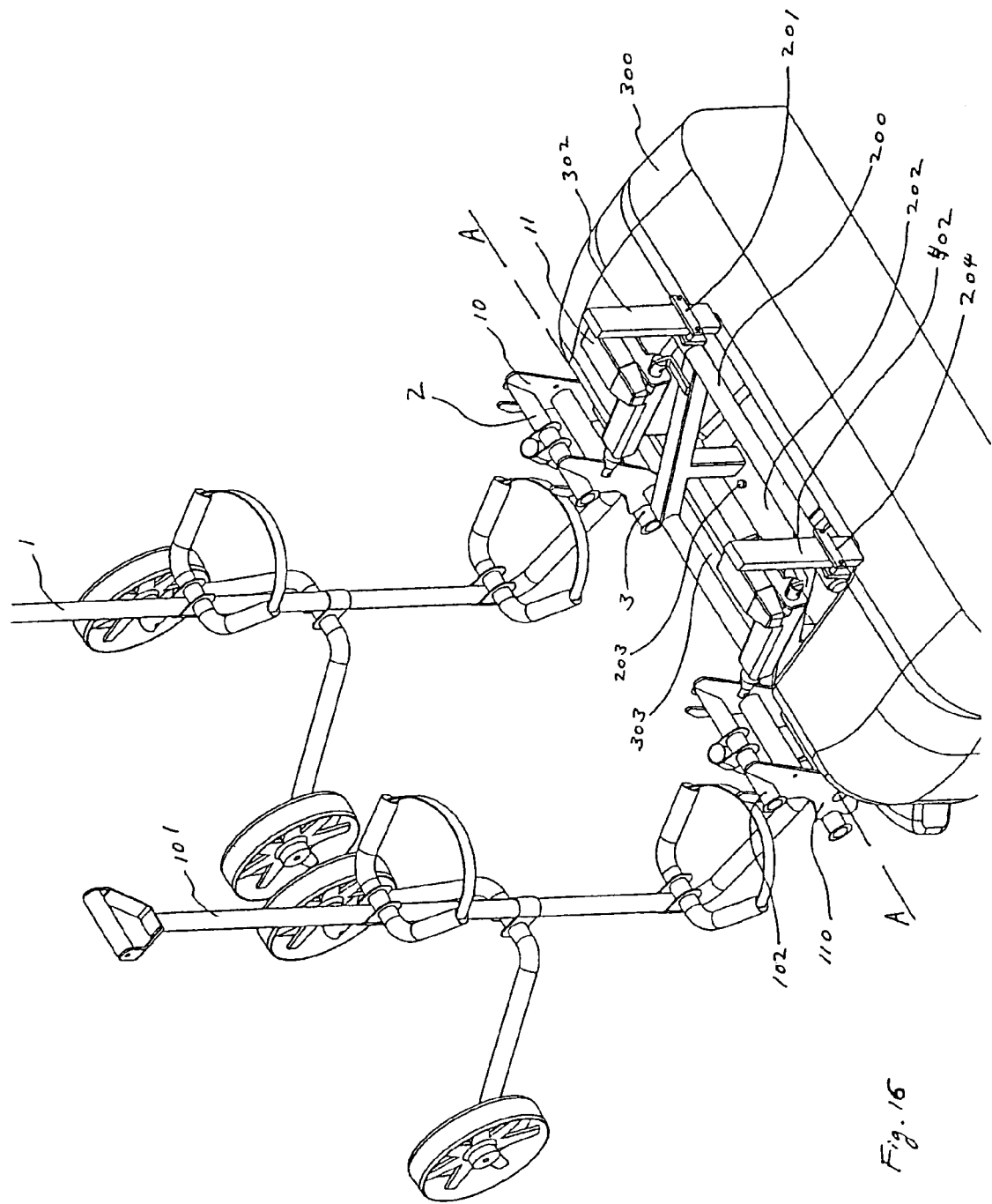

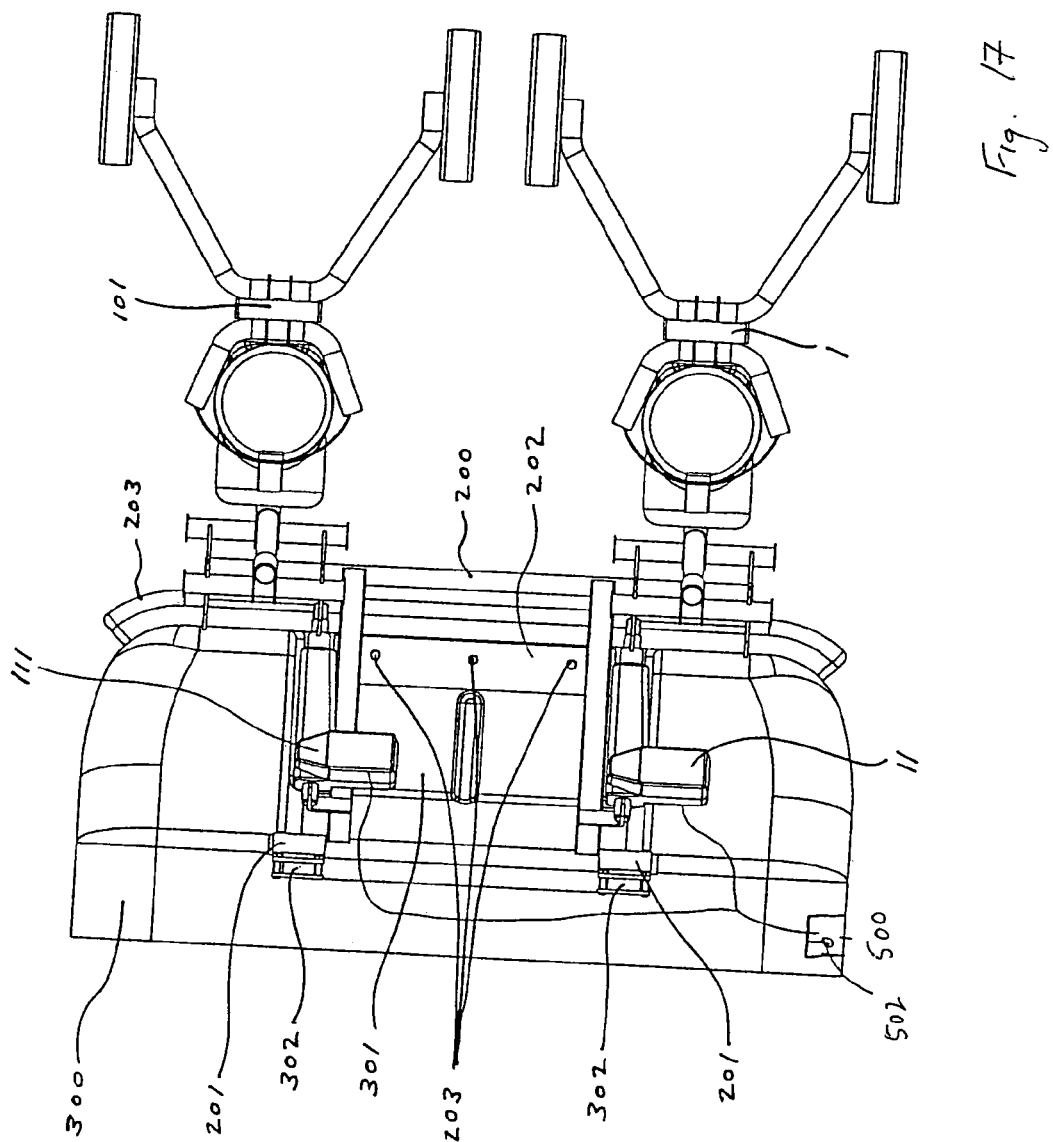

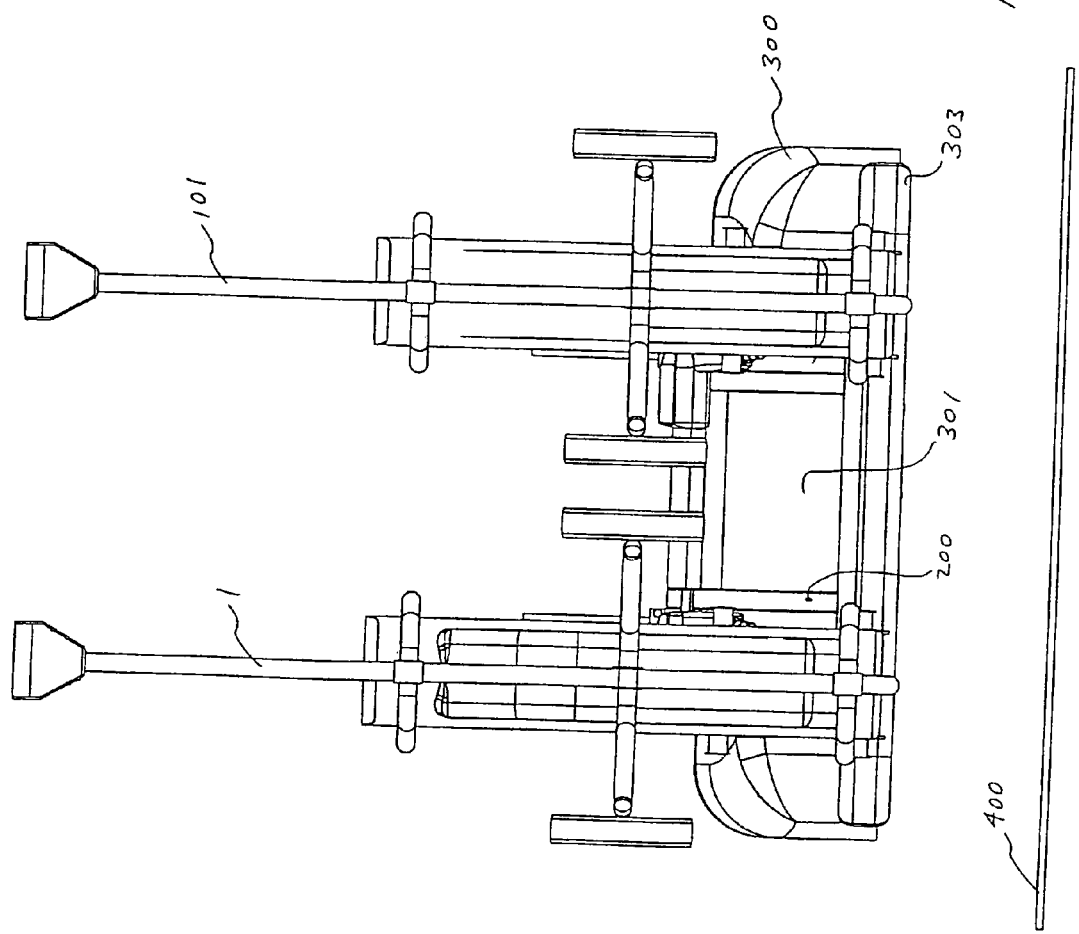

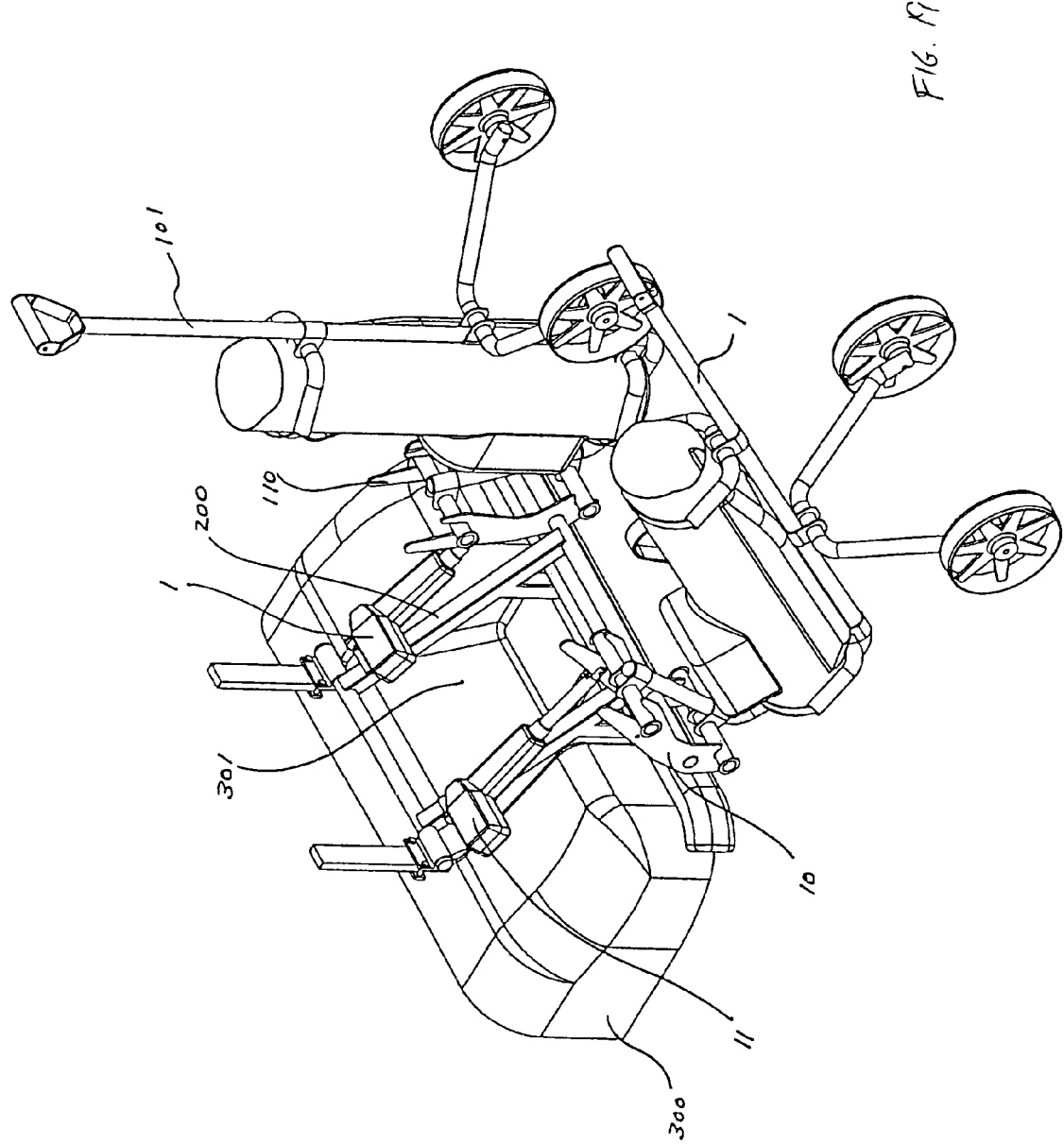

MOUNTABLE ACTUATING DEVICE FOR MOTORIZED VEHICLES

CROSS-REFERNCE TO RELATED APPLICATIONS

This is a divisional of U.S. patent application Ser. No. 10/159,634 filed May 31, 2002, now U.S. Pat. No. 6,705,624 issued Mar. 16, 2004, and claims benefit to U.S. Provisional Application No. 60/364,554 filed Mar. 15, 2002, both of which are hereby incorporated by reference herein.

BACKGROUND OF THE INVENTION

The present invention relates generally to golf carts, also known as golf cars, and other small trunkless motorized vehicles.

On a golf course, golfers often carry their own golf clubs in a golf club bag. The golfers may walk the entire course with the golf club bag held by a strap swung over their shoulder. A typical set of golf clubs may include 12 golf clubs or more. The set of clubs thus is often heavy and cumbersome to carry over an entire course. A caddie may accompany the golfer to aid in carrying the golf clubs.

Wheeled golf club carriers, also known as pull carts, have been developed to permit golfers to wheel their clubs over the course, by pulling the carrier by hand. The golf club carriers typically permit a golf bag to be attached by straps, and the golf bag is thus transported over the entire golf course by the golfer pulling or pushing the carrier. Such manual golf club carriers and the associated walking of the entire course however lead to slow golf games, which can be a major problem on popular golf courses. Moreover, some golfers fatigue or are incapable of walking an entire golf course, which can require 4 kilometers of travel or more.

Motorized golf carts, typically having electric or internal-combustion motors, also are known. Some courses even require such carts to speed golf play. These motorized golf carts typically move along specially-designated areas, or cart paths, on the golf course so that golfers can proceed with ease quickly throughout the golf course. Some golf courses permit golf carts to travel not just on the cart paths, but also over the entire course, including fairways. However, this travel can damage the golf course. For example, when a fairway is wet, the golf carts can leave muddy track marks on the fairway or even on the greens. For this reason, many golf courses confine motorized golf carts to the cart paths.

When using a motorized golf cart, golfers typically place their golf bags in the golf cart and strap them in. They do not remove the bags during play, since the bags with the clubs are heavy and the golf bag must be lifted to be strapped in. Typically, the bottom of the bag sits at least 0.3 meters from the ground, and the straps are even higher. The lifting of the golf bag in the first place is also burdensome.

On a course where the motorized golf carts are confined to the cart paths, golfers without caddies typically golf as follows: (1) The golfer drives his cart to a tee, decides what club to use and removes that club from the golf bag located in the golf cart, and then tees off; and (2) the golfer then drives the cart along the path to a location near the golf ball, guesses which one or two clubs might be proper, removes the clubs from the golf bag situated or attached to the golf cart; and then walks to the golf ball with the clubs in hand, and hits the ball. This second step continues until the golfer has placed the ball in the cup.

A problem occurs when a golfer selects the wrong club or clubs from the bag in the motorized cart. Improper selection can occur for example because of the lie or by mistaking the distance of the ball or the wind speed at the location of the ball. The golfer then must walk back to the cart and replace his clubs with a proper club. Since his ball may be a long distance from the golf cart, a long delay can result. Moreover, the partner in the motorized golf cart, which typically has two seats, could have driven the motorized cart to a new location, leading to even longer delays.

If two players are using a motorized cart on a golf course where motorized carts are permitted on the fairway, a similar problem may occur: the first golfer may choose one or two clubs, and the second golfer will drive the cart to a new position. If the first golfer has chosen the wrong clubs and must return to the golf cart at a new location to exchange clubs, the speed of play can be drastically reduced.

U.S. Pat. No. 5,472,084 discloses a piggyback golf bag for use in a riding golf cart. An attachment device can connect the golf bag to the golf cart. The golf bag when attached to the golf cart rides in a compartment and must be lifted onto the golf cart.

U.S. Pat. Nos. 6,193,256 and 5,482,304 disclose trailer devices for golf equipment. The golf equipment trailer of the '256 patent does not function as a golf club carrier, which is defined herein as a manually-movable golf club carrier, such as push or pull cart. The pull-type golf cart of the '304 patent is attachable solely to a bicycle, and appears not to be intended to be detachable during play but rather that the bicycle be ridden on the golf course.

U.S. Pat. No. 6,238,171 discloses a portable towing apparatus fitting in the golf bag bay of a golf cart for towing another disabled golf cart.

SUMMARY OF THE INVENTION

In light of the problems associated with motorized golf carts, the present applicant disclosed motorized golf carts provided with hitches in U.S. patent application Ser. No. 09/924,039 filed Aug. 7, 2001, now U.S. Pat. No. 6,715,744, and U.S. patent application Ser. No. 09/961,882, filed Sep. 24, 2001, now U.S. Pat. No. 6,739,604, both of which are hereby incorporated by reference herein. Wheeled pull carts can be attached to the hitches. Through spring forces, for example, energy may be stored to assist the golfer in raising the center of gravity of the pull cart and to lift the wheels.

An object of the present invention is to permit golfers to more easily attach a golf club carrier, such as a pull cart, to a motorized golf cart. Another alternate or additional object is to provide motorized golf carts with the capability for easily attaching all types of detachable devices to the golf cart. Still a further alternate or additional object of the present invention is to reduce the amount of lifting required to attach golf club carriers or other devices to the motorized golf cart. One other alternate or additional object of the present invention is to speed the play of golf on a golf course.

The present invention provides a motorized golf cart having a motor for driving the golf cart, a motorized actuator and a first hitching device, the actuator connected to the first hitching device for moving the first hitching device between a first position and a second position.

By having a motorized actuator move the hitching device, various detachable devices can be attached to the hitching device and lifted by the actuator, without any manual lifting force being required.

Preferably, the motorized golf cart includes a detachable device with at least one wheel, the detachable device being connectable to the first hitching device in the first position, the at least one wheel being retracted in the second position. "Retracted" as defined herein means that the wheels are not in contact with the ground.

Preferably, the detachable device is a manually-operable golf club carrier having a carrier hitching device for attaching to the first hitching device when the first hitching device is in the first position. The golf club carrier thus can be easily attached and detached to the motorized golf cart, using the actuator and without any lifting, as the golf cart is driven and then stopped at various points along a cart path or anywhere on the course. The golfer can unhitch the golf club carrier by reversing the actuator and wheel it, along with all the golfer's golf clubs, to a desired location on the course. Any club can be selected. The first golfer's companion, if any, in the golf cart can drive the cart on to the next desired location, without worrying that the first golfer will need to return due to improper club selection. The first golfer can then wheel the golf club carrier to the next ball location or back to the motorized golf cart, where it can be easily reattached without lifting.

Advantageously, with the hitching devices of the present invention, other detachable devices with at least one wheel may be attached to the first hitching device and lifted. Thus, shopping carts, specialized carts for garden tools, wheelchairs, and other devices may be interchanged and carried by the golf cart. The actual sizes and limits of the detachable devices is a function of the rating of the actuators and the weight and center of gravity of the detachable devices. The detachable devices may include a further hitching device for connecting to the first hitching device.

The first hitching device may include at least one bracket and the further hitching device may include a horizontal bar. However, the term hitching device as defined herein is any device operable for securing the detachable device.

The motorized golf cart preferably has two seats, and four wheels. The golf club carrier preferably includes a golf club bag removable from the carrier body, although the bag may be integrated with the golf club carrier.

Preferably, the golf cart includes a second hitching device, and a second actuator for moving the second hitching device between a third position and a fourth position. Thus two detachable devices can be selectively attached to the golf cart.

Preferably, the golf cart has a rear bag bay, and the first hitching device and first actuator attach to the golf cart in the rear bag bay. The second actuator and second hitching device also may fit into the rear bag bay.

The first and second actuators preferably are motorized linear actuators. Preferably, the linear actuators are powered by a rechargeable battery, for example the battery of the motorized golf cart or separate batteries provided for the actuators. Most preferably, the actuators are dc motor powered linear ball screw actuators. The present applicant has found that Linak LA-31 electrically-driven fast motor actuators with a 150 mm stroke, available commercially from LINAK U.S., Inc., 2200 Stanley Gault, Pkwy, Louisville, Ky. 40223 are possible actuators for use with the present invention.

Other possible motorized actuators can include: air-cylinder driven actuators receiving compressed air from an on-board compressor or small tank of compressed air charged, for example, daily; an actuator with an hydraulic cylinder with a hydraulic motor or pump, or a retractable cable-based actuator.

The detachable devices preferably include at least a frame section made metal, such as aluminum or steel, to improve stability.

The first hitching device preferably is rotatably connected to the golf cart around a first axis, and the first actuator rotates the first hitching device about the first axis. Preferably, the second hitching device also is rotatable about the first axis, through the second actuator.

The first hitching device may extend beyond the rear of the golf cart, and be located at the rear of the golf cart. The first position then preferably is located further away from a center of the golf cart than the second position, so that the first hitching device may pulled inwardly by the actuator so as to lift the detachable device.

Preferably, a switch is provided to actuate the actuator to move between the first and second positions. The actuator also can be actuated to move from the first position to the second position by contact of the hitching device with the detachable device.

The present invention also provides a mountable actuating device for motorized vehicles comprising: a frame, a first hitching device and a second hitching device movable with respect to the frame, a first actuator connected to the frame for moving the first hitching device between a first position and a second position, and a second actuator connected to the frame for moving the second hitching device with respect to the frame between a third position and a fourth position.

With the mountable actuating device of the present invention, the device can be easily pre-assembled and placed on a motorized vehicle such as a golf cart.

The actuating device preferably includes attachment devices, for example nuts and bolts, so that it may easily be retrofitted to existing golf carts, preferably in the bag bay. Preferably, the attachment devices include two bracket assemblies for connecting to bag holder frames of the golf cart.

The actuators preferably are linear motorized actuators powered by a rechargeable battery.

The present device could be used with other vehicles other than golf carts. The present invention thus also provides a motorized vehicle comprising: a motor, a rechargeable battery, a hitching device and an actuator driven by the battery, the actuator moving the hitching device between a first position and a second position. The rechargeable battery may be an additional battery to the battery of the motorized vehicle, or the same, if the vehicle already includes a rechargeable battery. A second actuator may also be provided.

The present invention also provides a method for connecting a wheeled detachable device to a motorized golf cart comprising the steps of wheeling the detachable device aside the motorized golf cart, connecting the detachable device to the motorized golf cart while the at least one wheel remains on a ground surface, and actuating an actuator to retract the at least one wheel off the ground surface.

The wheeled detachable device preferably is a golf club carrier, which may be unhitched from the motorized golf cart repeatedly over during a golf game.

In addition to the advantages of the present invention enjoyed by the golfer, the golf course operator employing the present invention can: (1) maintain a well-groomed course by restricting ride carts to the paved paths or only to 90° fairway angles; (2) improve the pace of play (more golfers per day means more money per day) by enabling golfers to have ride cart speed with golf club carrier access; (3) charge an additional fee for the golf club carrier attachment, since the ride carts can be operated with or without the pull cart attachment; and/or (4) attract golfers to the course by offering improved access and convenience over the course.

The present invention also has the added advantage that a foursome golfing with two carts can switch partners easily and repeatedly throughout a golf game. For example, a first golfer and a second golfer have carriers attached to one golf cart, and a third and fourth golfer have carriers attached to the second cart. The first golfer and second golfers hit balls near the ball of the third golfer. The fourth golfer's ball is further away. The first golfer and second golfers can drive to near their balls, and release their carriers. The fourth golfer can drop off the third golfer, who detaches that golfer's carrier. The fourth golfer can proceed further. Any of the first, second and third golfers, perhaps the one closest, can then later join up with the fourth golfer and the second golf cart and reattach the golf bag carrier. When playing a foursome (or threesome), this arrangement also eliminates worry about the pairing of golfers in the golf carts at the start of the game, since the golfers may switch carts easily. Also speed of two-cart play can be significantly increased, since players can return to the closest cart.

The present invention also encompasses a detachable device for connecting to a motorized hitch comprising a frame; a handle mounted to the frame; at least one wheel mounted to the frame; and a hitching device connected to the frame, the hitching device including a first mount tube horizontal to the ground and a second mount tube parallel to the first mount tube, or including a double claw hitching device.

The present invention also encompasses a detachable shopping cart for connecting to a motorized hitch comprising a frame; a handle mounted to the frame; at least one wheel mounted to the frame; a carrying section for groceries or goods, and a hitching device connected to the frame.

BRIEF DESCRIPTION OF THE DRAWINGS OF THE PREFERRED EMBODIMENT

The present invention will be shown with reference to a preferred embodiment of the present invention, in which:

FIG. 15 shows the golf club carrier released from the motorized golf cart;

FIG. 16 shows a different perspective view of the FIG. 2 configuration, the golf bags not being shown for clarity;

FIG. 17 shows a top view of the FIG. 2 configuration;

FIG. 18 shows a rear view of the FIG. 2 configuration; and

FIG. 19 shows the FIG. 2 view with the first actuator near the first position.

DETAILED DESCRIPTION OF THE PREFERRED EMBODIMENT

The present invention will be described with reference to a preferred embodiment.

Figure 1:
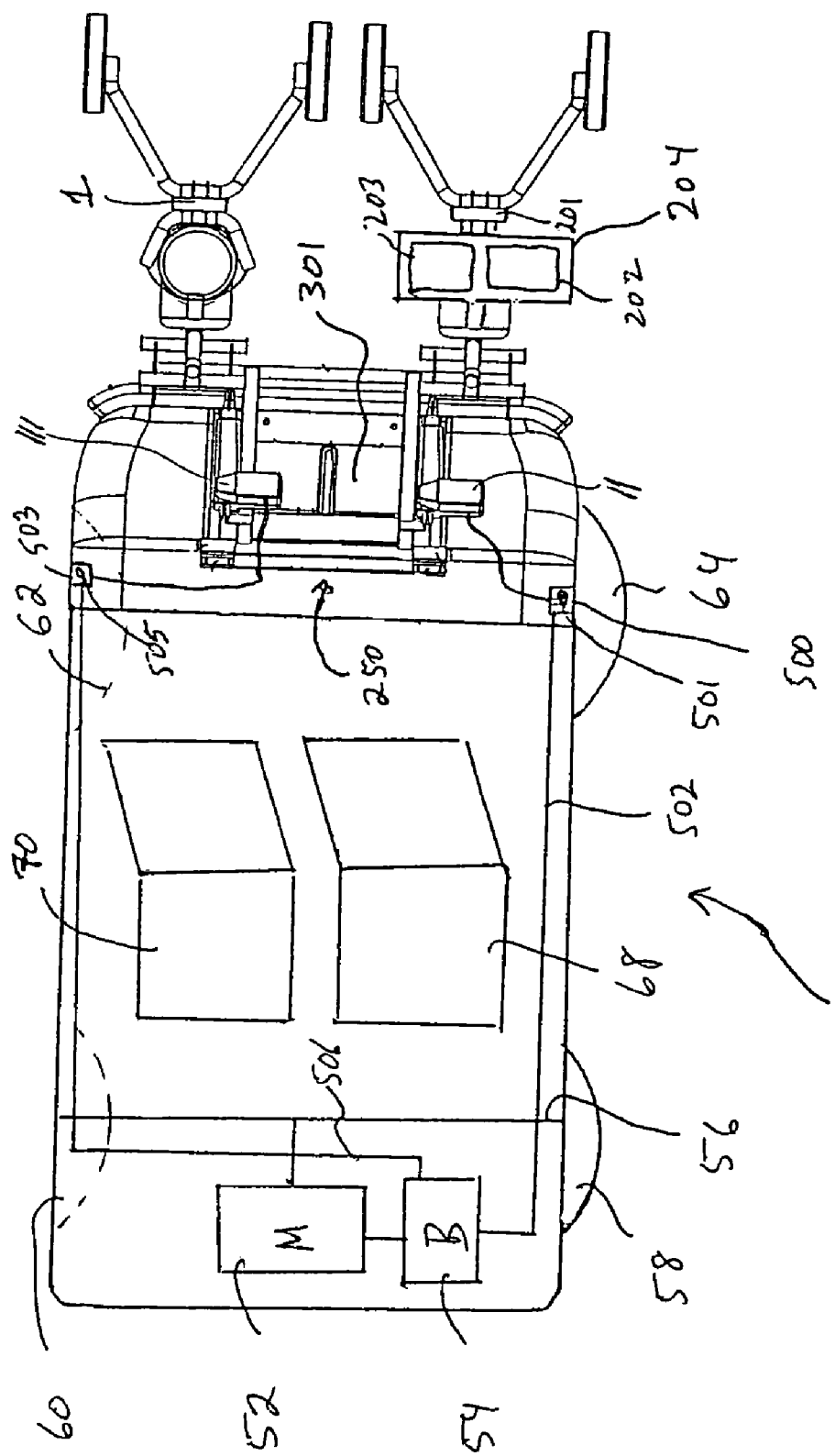
FIG. 1 shows a schematic top view of the golf cart of the present invention, with a shopping cart as one of the detachable devices and a wheeled golf cart carrier as another.

FIG. 1 shows, in schematic form, a motorized golf car or cart 300 having a motor 52 with an axle 56 driving front wheels 58, 60 of the cart 300. The motor 52 may be any type of motor, for example electric or internal combustion driven. The cart 300 also has a battery 54, which preferably is rechargeable. The cart 300 is an existing cart having a golf bag bay 301, which has been retrofitted with an actuating device 250. Attached to the actuating device are detachable devices, including a shopping cart 201, and a wheeled golf club carrier 1. Shopping cart 201 may have a square shaped holder for two shopping bags 202, 203, for example. The golf cart 300 also has rear wheels 62, 64 and a first seat 68 and a second seat 70. The motor 52 also could drive rear wheels 62, 64, and first seat 68 and second seat 70 may be side-by-side in the form of a single bench seat.

An electrical circuit from battery 54 may power actuators 11, 111, with actuator 11 permitting lifting and releasing of detachable shopping cart 201, and device 111 permitting lifting and releasing detachable golf club carrier 1. An electrical supply line 502 may power actuator 11 and supply line 506 may power actuator 111. A switch 500, with an up/down knob 501, may raise or lower shopping cart 201 and a switch 503 with an up/down knob 505 may raise or lower golf club carrier 1, or other detachable devices.

The Linak LA-31 electrically-driven fast motor actuators discussed above, for example, run on 24 volts, so that four 6 volt rechargeable batteries, often present in existing electrically-driven motorized golf carts can be used to power the actuators. The connecting of the electrical circuit thus may be accomplished by accessing rechargeable batteries of the electrically-driven golf cart and connecting one wire to a negative terminal of a first battery and the other wire to a positive terminal of a fourth battery. If the golf cart is internal combustion driven, rechargeable batteries may be provided separately.

Figure 2:
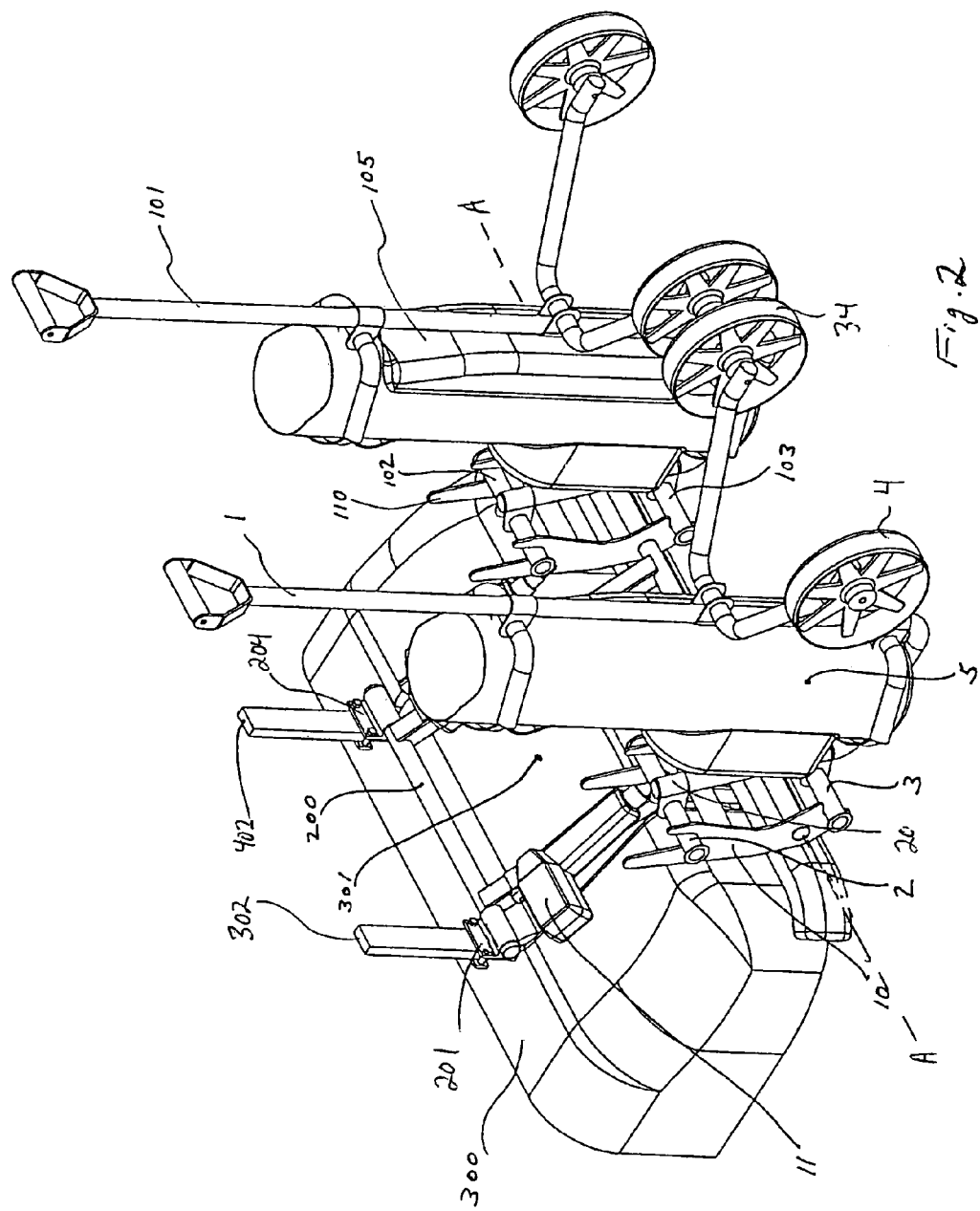
FIG. 2 shows the golf cart with two hitching devices and two detachable wheel golf club carriers attached to the hitching devices.
Figure 6:
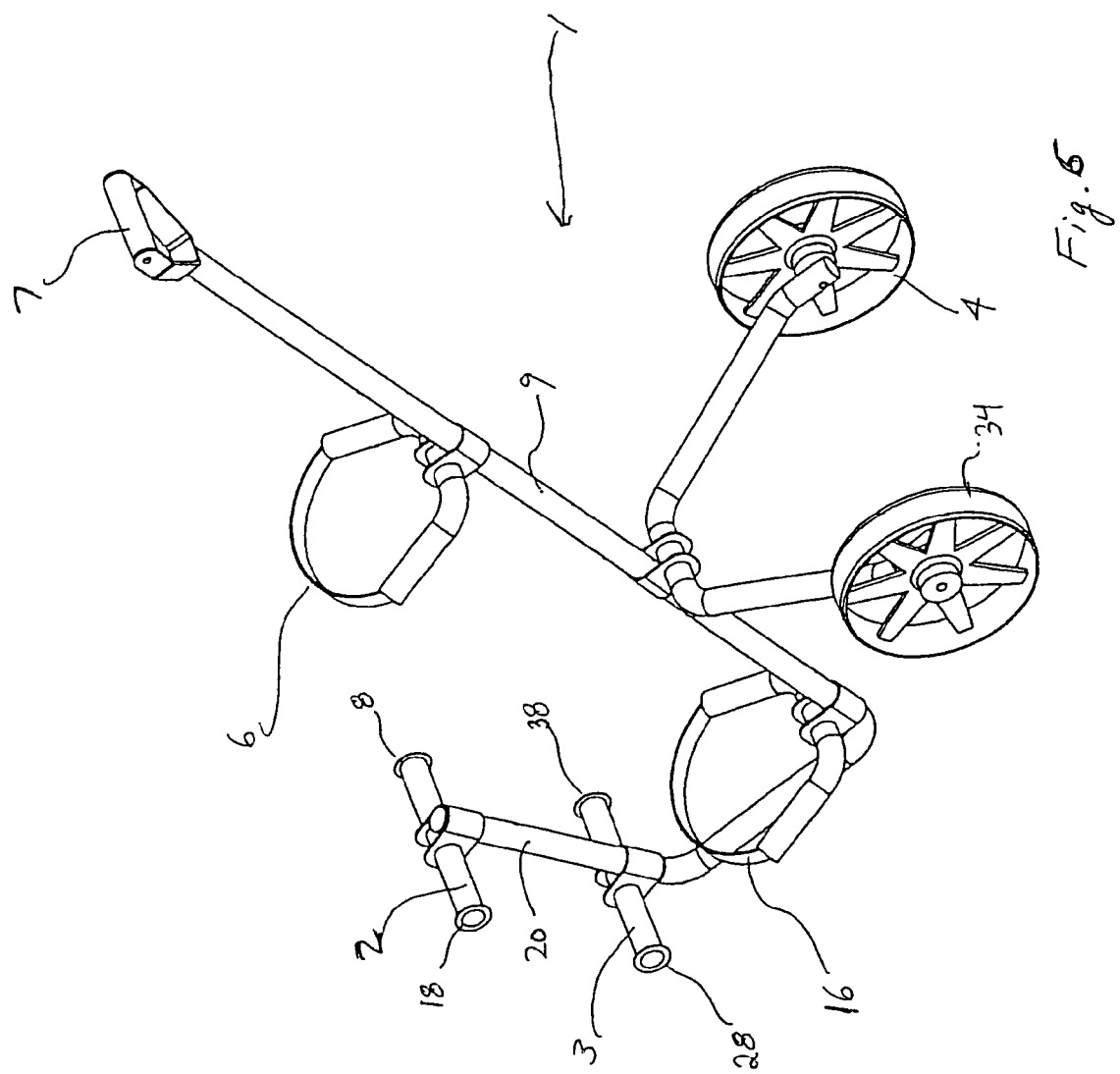
FIG. 6 shows a golf club carrier of the present invention.

As shown in FIG. 2, the detachable devices may also be two wheeled golf club carriers 1, 101. Wheeled golf club carrier 1 has wheels 4, 34 and a carrier hitching device 20 having a first mount tube 2 and a second mount tube 3. Carrier 1 includes a golf bag 5, which is attached by a golf bag holder or straps. As shown in FIG. 6, each wheeled golf club carrier 1 has a handle 7, golf bag holders 6, 16, wheels 3, 34, and a main frame 9. Carrier hitching device 20 has mount tubes 2, 3, which have end caps 8, 18 and 28, 38 respectively. The parts of carrier 1 are all fixed to each other, except that holders 6, 16 can be tightened, and wheels 4, 34 are rotatable.

As shown in FIG. 2, carrier 101 may be identical to carrier 1, and have a golf bag 105, an upper mount tube 102 and a lower mount tube 103.

Carrier 1 is detachably connected to a lift bracket 10, which can rotate about an axis A-A. Above the axis A-A, the bracket 10 is connected to a linear actuator 11, which can rotate the bracket 10 about axis A-A. The other end of actuator 11 is connected rotatably to a actuating device frame 200, which is attached via a bracket assembly 201 to a bag holder frame 302 of golf cart 300. Another bracket assembly 204 connects to another bag holder frame 402 of golf cart 300.

Second carrier 101 is detachably connected via tubes 102, 103 to a second bracket 110, also rotatable about axis A-A. Brackets 10, 110 thus defined hitching devices for hitching the carriers 1, 101 to the golf cart 300.

Figure 3:
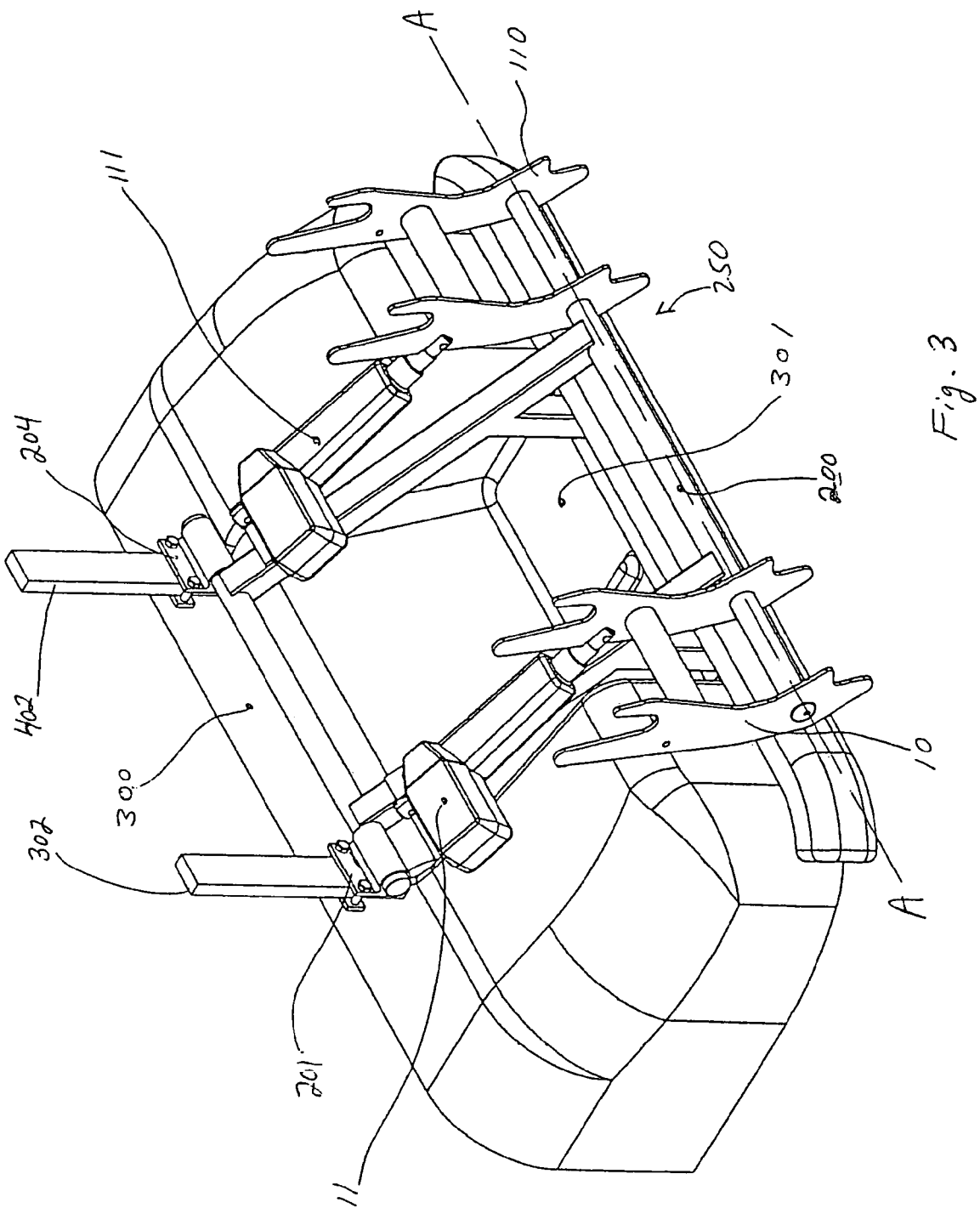
FIG. 3 shows the golf cart of FIG. 2 with the wheeled golf club carriers removed.

FIG. 3 shows more detail of frame 200 of the actuating device 250. Second actuator 111 is connected to mount bracket 110, so as to enable mount bracket to selectively rotate about axis A-A.

Figure 4:
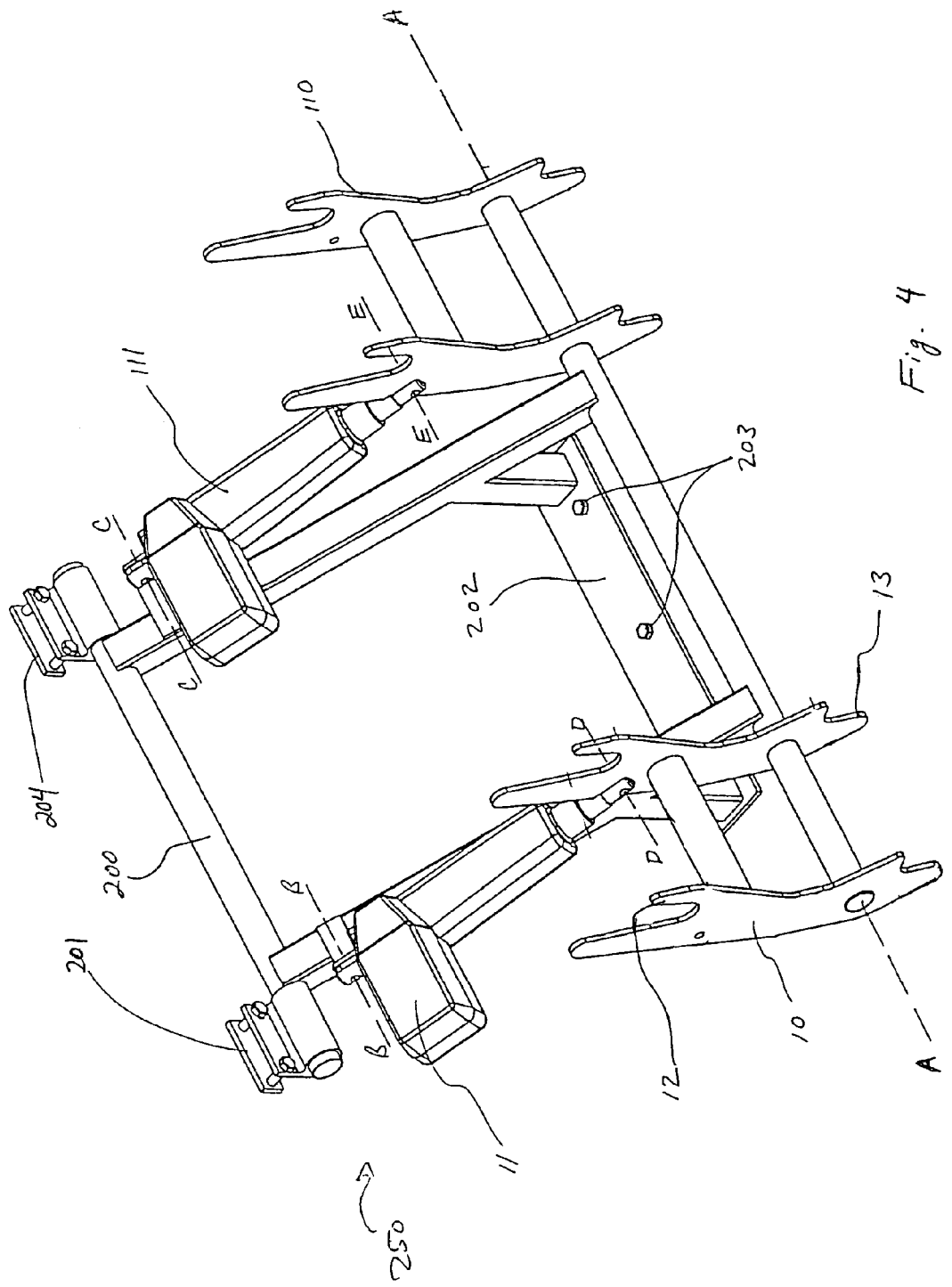
FIG. 4 shows a view of the actuating device of the present invention.

FIG. 4 shows the actuating device 250 in more detail. Frame 200 may include a foot plate 202, which may be attached by bolts 203 to the bag bay 301 (FIG. 2), for example though water drainage holes. Nuts may be used to fasten the bolts. Device 250 thus is easily mountable in the golf bag bay 301 using brackets 201, 204 and bolts 203.

The mount bracket 10 preferably has an upper claw 12, and a lower claw 13. Attached to the mount bracket 10 at one side is the actuator 11, which may be pivotally connected about an axis D. The other end of actuator 11 may be pivotally connected to frame 200 about an axis B.

Likewise, second actuator 111 may be pivotally connected to frame 200 about an axis C, and to a side of mount bracket 110 about an axis E. When actuator 11 and actuator 111 are in a same position, axes D and E preferably are coaxial, as are axes B and C.

Frame 200 preferably is made of metal, although it could also be made of high-grade plastic.

Figure 5:
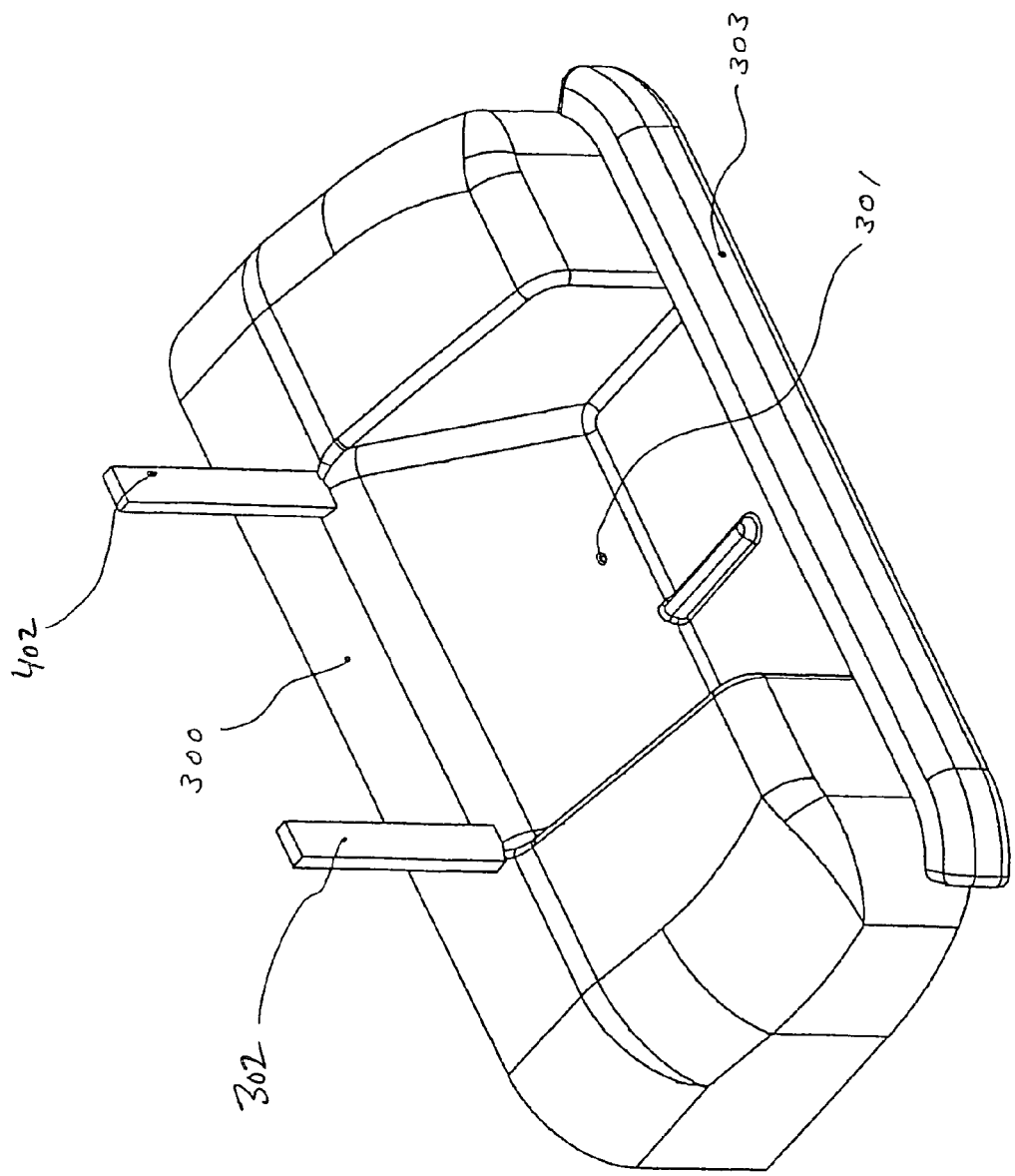
FIG. 5 shows a view of a conventional rear bag bay of a motorized golf cart.

FIG. 5 shows a convention rear of a golf cart 300 with a bag bay 301, without retrofitting with actuating device 250. Golf cart 300 has a bumper 303.

Figure 7:
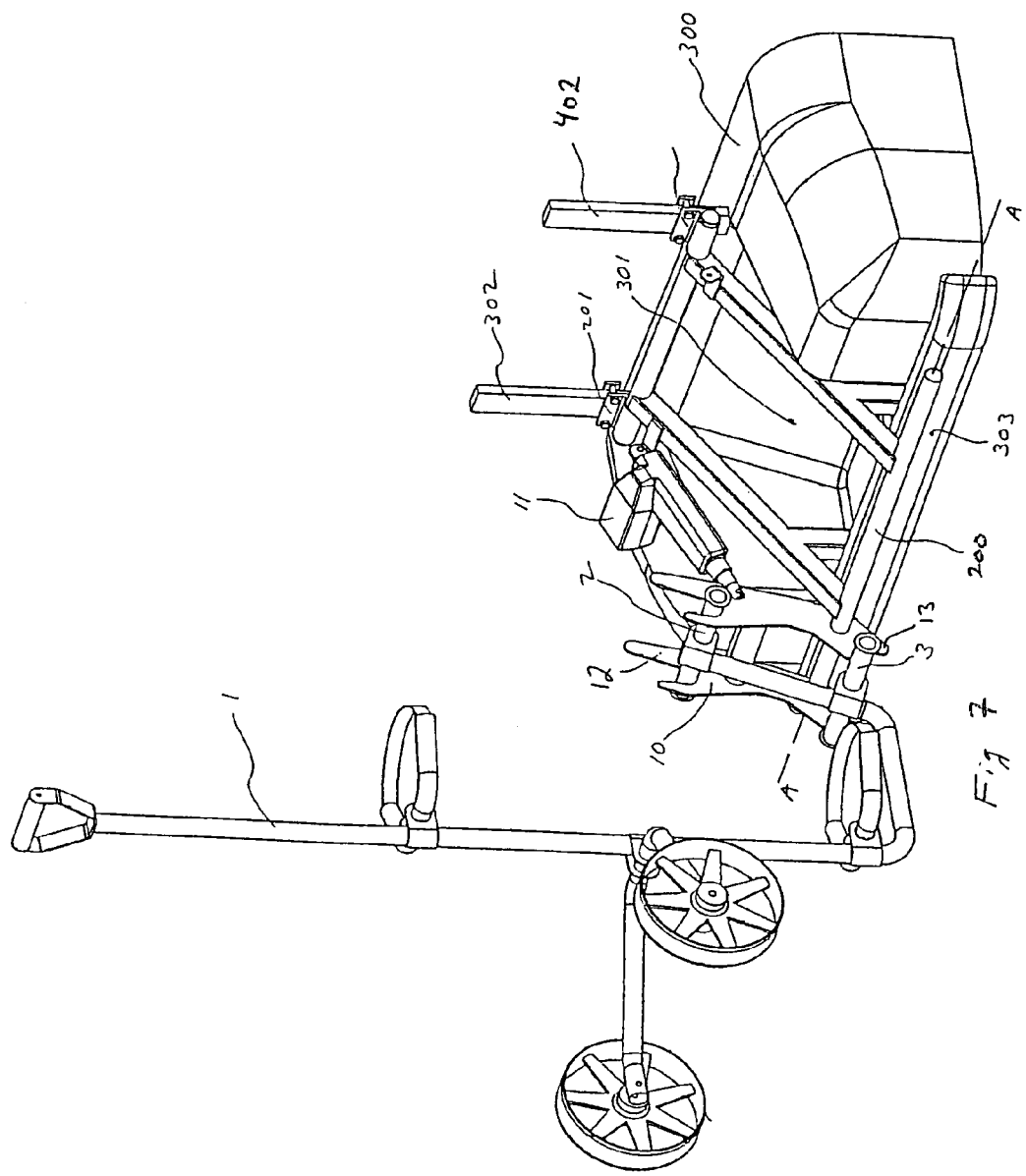
FIG. 7 shows the golf club carrier as in FIG. 6 with the golf club carrier attached in the retracted position to the first hitching device, the second hitching device and second actuator of the actuating device not being shown for clarity.
Figure 8:
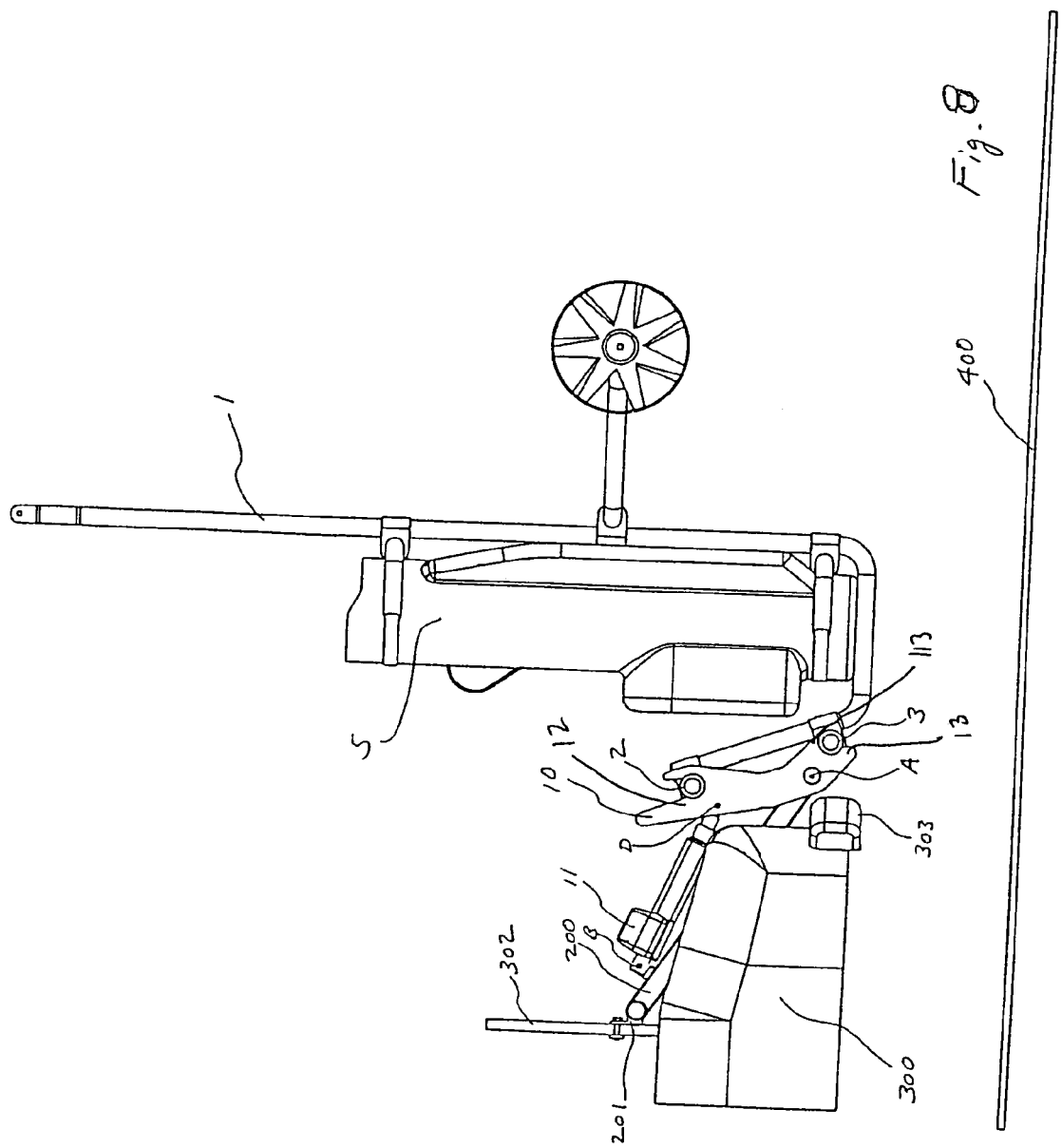
FIG. 8 shows a side view of FIG. 7 with the first hitching device in the second position.

FIGS. 7 and 8 show the golf club carrier 1 attached in the retracted position to the first hitching device comprised of lift bracket 10 in its second or retracted position. Upper mount tube 2 fits in upper claw 12, and lower mount tube 3 fits in lower claw 13. The second hitching device and second actuator of the actuating device, as well as golf bag 5, are not shown in this view for clarity.

Lower claw 13 preferably is spaced from upper claw 12 so that when upper mount tube 2 is located fully fit in upper claw 12, lower mount tube 3 can rotate freely into and out of claw 13, although as shown in FIG. 8, the weight of carrier 1 causes a torque about tube 2 that holds mount tube 3 firmly in claw 13. However, the lower mount tube 3 may be sized to just pass into claw 13 with a slight friction fit as it passes a front finger 113 of claw 13. Tube 3 may include a friction reducing element, such as a plastic wheel or Teflon-coating at the contact point with finger 113 of claw 13.

Figure 9:
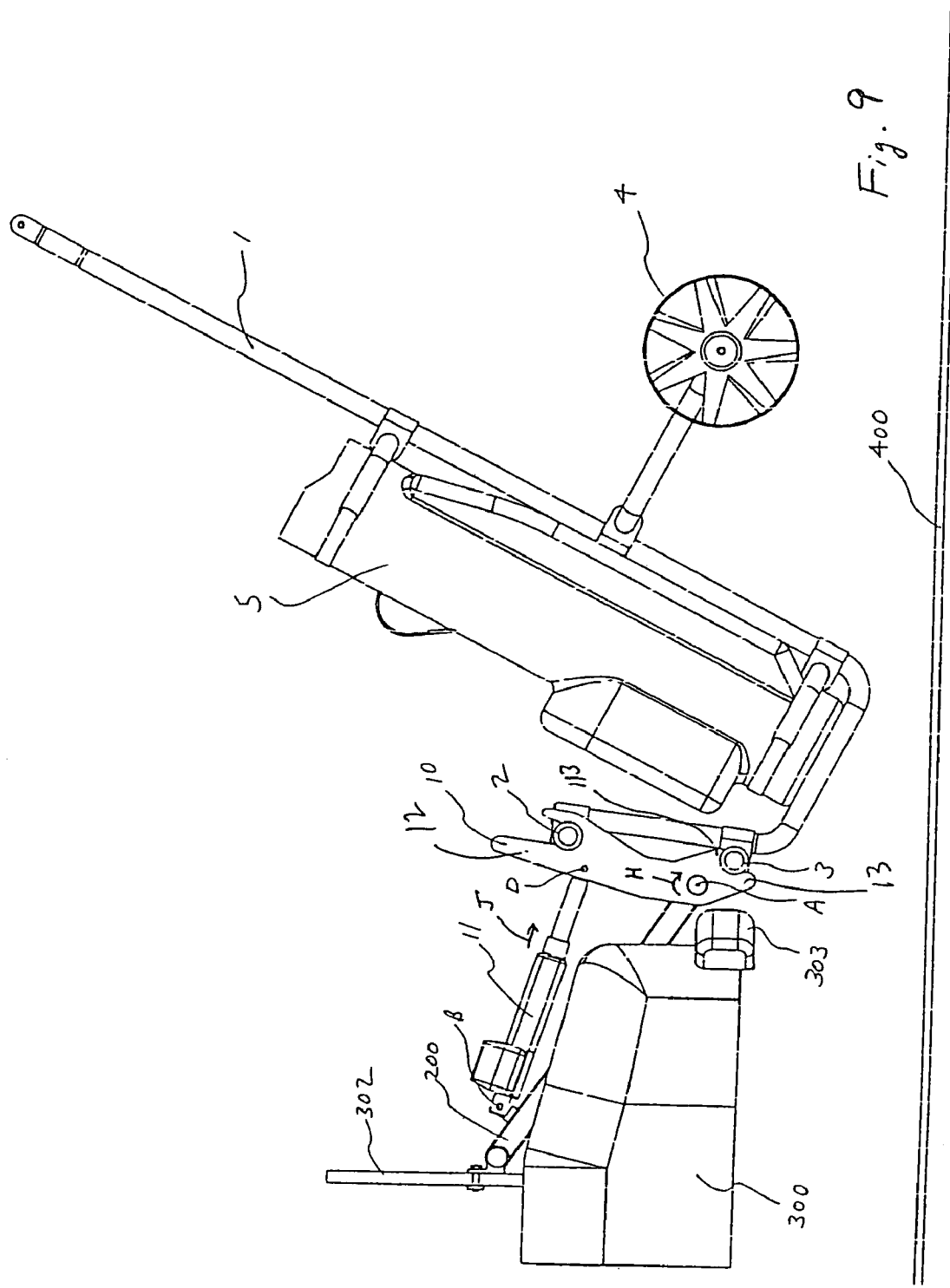
FIG. 9 shows the same view as FIG. 8, with the first hitching device between the second position and the first position.

FIG. 9 shows golf club carrier 1 being lowered, for example by a golfer lowering knob 501 of switch 500 (FIG. 1). Linear actuator 11 thus extends in the direction of the arrow J, causing lift bracket 10 to rotate in the direction of the arrow H about axis A. Mount bracket 10 can for example be mounted with a bearing on frame 200, which includes a bar coaxial with axis A. Thus, the first hitching device is between the second position shown in FIG. 8 and a first position where the linear actuator is fully extended. The wheel 4 however remains off of ground 400.

As the claw 12 of bracket 10 rotates in direction H, torque caused by the weight of carrier 1 keeps mount tube 3 in claw 13, since a clockwise torque as shown in FIG. 9 is created about mount tube 2.

Figure 10:
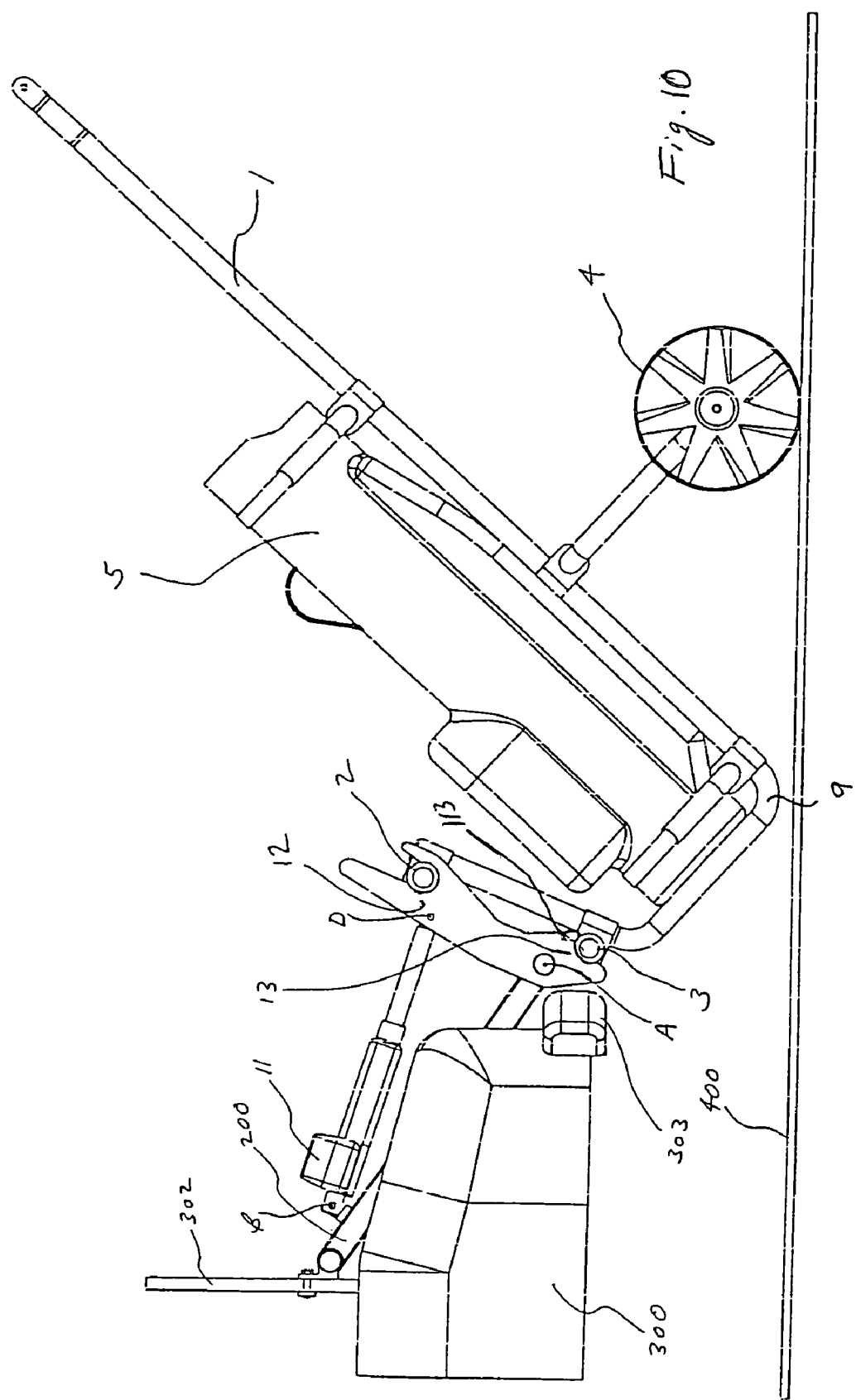
FIG. 10 shows the same view as FIG. 9, with the first hitching device near the first position, where the wheels of the golf club carrier are attached to ground.
Figure 11:
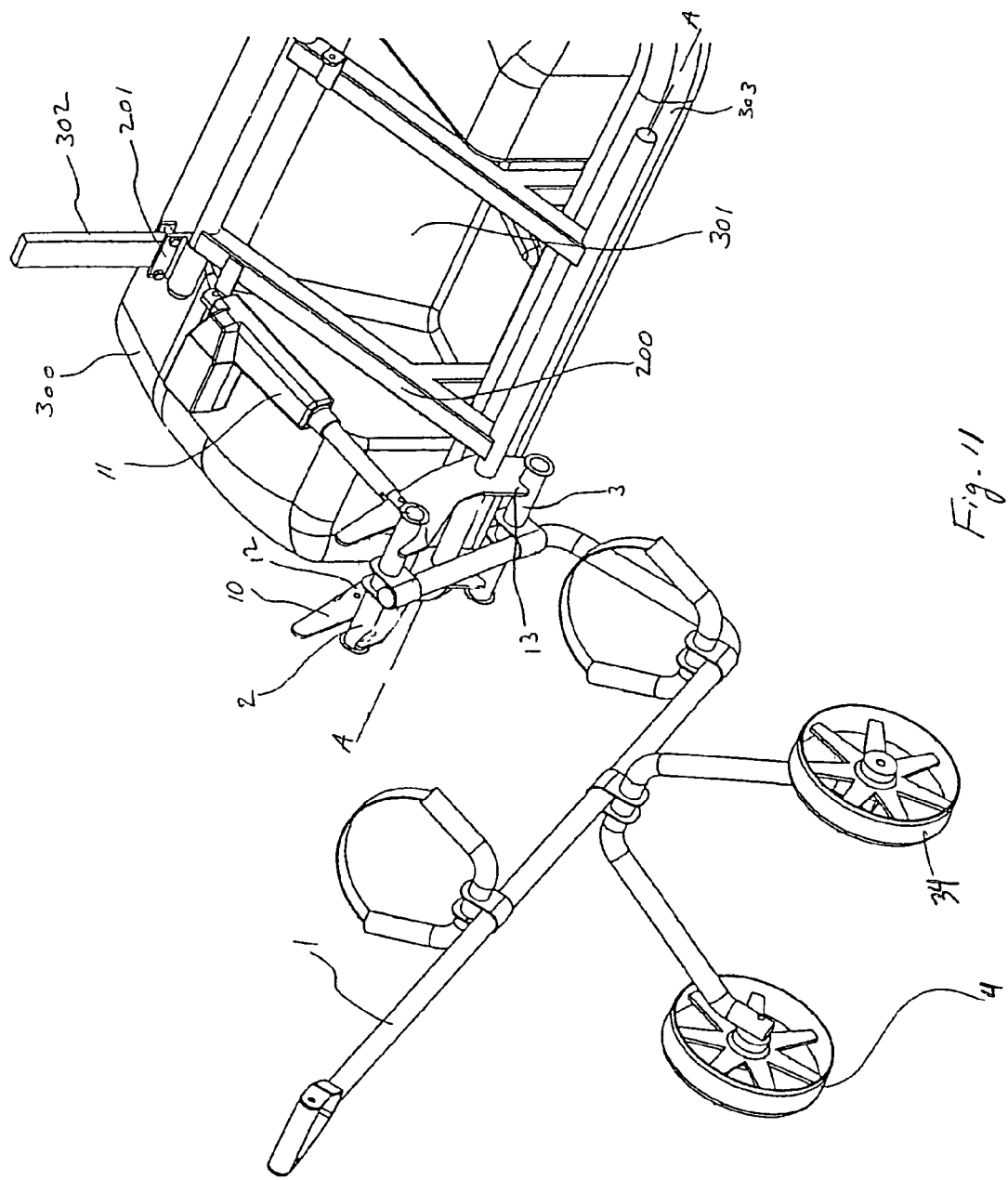
FIG. 11 shows a perspective view with the first hitching device in the first position, with the second hitching device and second actuator of the actuating device not being shown for clarity.

FIG. 10 shows the actuator 11 before its first or fully extended position. As shown in FIG. 10, wheel 4 contacts ground in this position, but frame 9 remains above ground. Upper mount tube 2 remains in claw 12 and lower mount tube 3 in claw 13 of lift bracket 10 due to the torque caused by the weight of carrier 1. FIG. 11 shows a perspective view of actuator 11 in the first position, with the second hitching device and second actuator of the actuating device not being shown for clarity.

As shown in FIG. 10, the contact of wheel 4 with ground 400 however begins to create an opposite torque about tube 2, counterclockwise about tube 2 in the FIG. 10 view.

Figure 12:
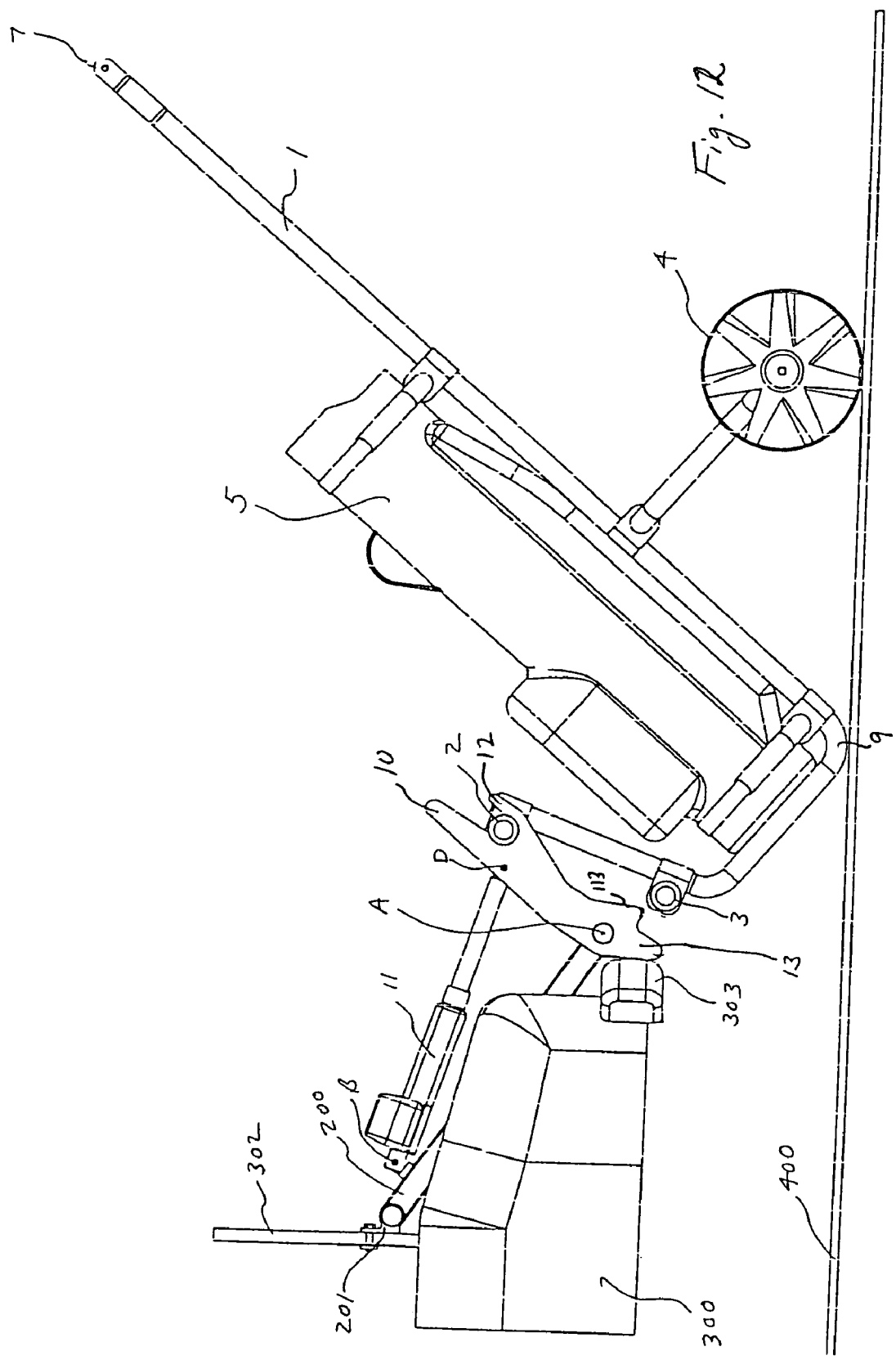
FIG. 12 shows a first release step of the golf club carrier from the first hitching device.
Figure 13:
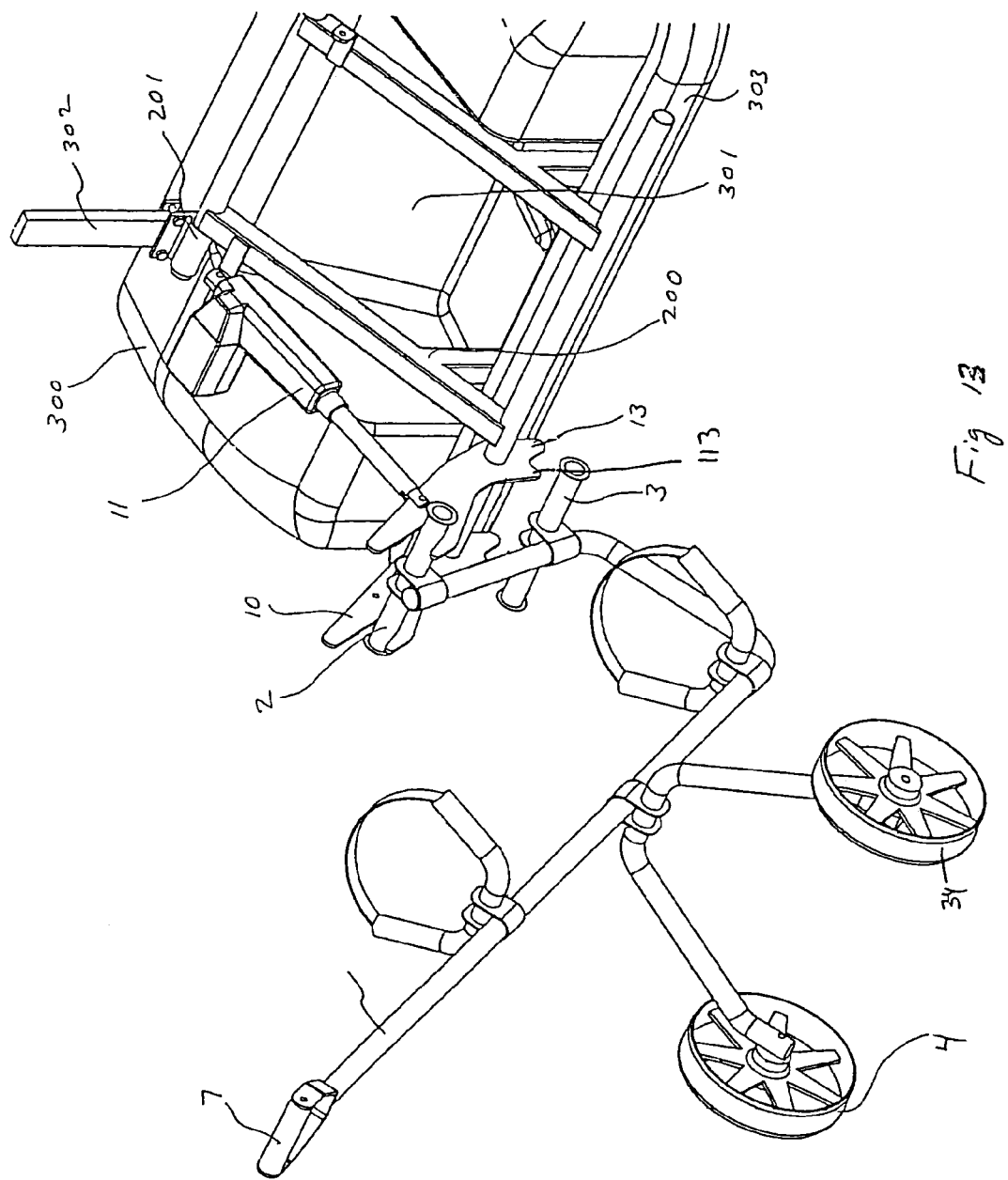
FIG. 13 shows a perspective view of the FIG. 12 release step.

FIG. 12 shows a first release step of the golf club carrier 1 from lift bracket 10 with actuator 11 in a fully extended position. As the actuator 1 extends past the FIG. 10 position, lower tube 3 swings free of claw 13 due to the torque created by wheel 4 contacting ground 400. Tube 3 moves past finger 113. Frame 9 can also contact ground 400. Bracket 10 may contact bumper 303 as an additional stop. FIG. 13 shows a perspective view of the FIG. 12 release step.

Figure 14:
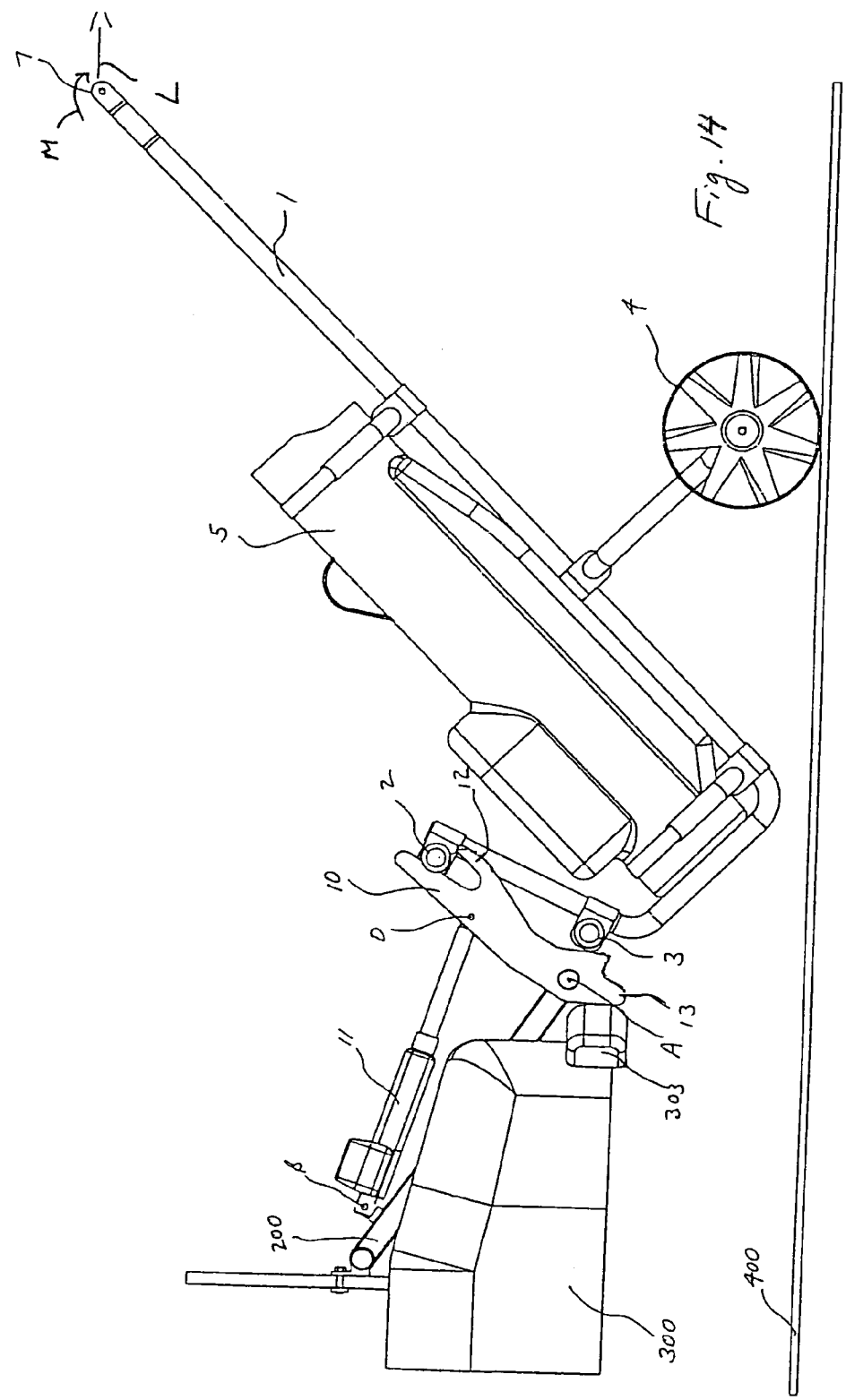
FIG. 14 shows a second release step of the golf club carrier from the first hitching device.

FIG. 14 shows a second release step of the golf club carrier 1. Once lower mount tube 3 has cleared lower claw 13, the user can rotate handle 7 in direction M to release upper mount tube 2 from upper claw 12 and then pull carrier 1 in direction L.

FIG. 15 shows the golf club carrier 1 fully released from the motorized golf cart 300.

To reattach golf club carrier 1 to lift bracket 10 or 110, upper mount tube 2 is positioned into upper claw 12, as shown in FIG. 12, by a user. The user then can move knob 501 upwardly, and switch 500 causes actuator 11 to retract, lifting golf club carrier 1 off ground 400. Alternately, the actuator 11 may begin to retract automatically once tube 2 is in claw 12, for example by pushing down a paddle actuator or completing an electric circuit.

As wheel 4 begins to lift off ground 400 as shown in FIG. 9, the clockwise torque about tube 2 created by the weight of carrier 1 causes mount tube 3 to move past finger 113 and enter claw 3. Rollers or friction coating on mount tube 3 may aid in reducing friction between finger 113 and tube 3, so that mount tube 3, "snaps" into lower claw 13.

It should be understood that carrier 101 and shopping cart 201 may have similar hitching devices as that of carrier 1. A locking device, for example, with a key, can be used to lock the carriers 1, 101, 201 to the golf cart for security.

Additional views of the present invention are provided as well. FIG. 16 shows a different perspective view of the FIG. 2 configuration, the golf bags not being shown for clarity. FIG. 17 shows a top view of the FIG. 2 configuration. FIG. 18 shows a rear view of the FIG. 2 configuration. FIG. 19 shows the FIG. 2 view with the first actuator just near the first position.

Many other types of detachable devices thus are possible to attach to the golf cart using the hitching devices. Wheelchairs and customized carriers, such as garden tool carriers for a garden tool set or golf course repair carriers with a course repair set, are possible. In some cases, both actuators can be used to lift a single detachable device with a hitching device or devices connected to both hitching devices on the golf cart. However, the user should then ensure that the lifting is synchronized.

What is claimed is:

1. A mountable device for a golf car comprising:
a frame for placement in a bag bay of the golf car, the frame having a frame section contacting a bottom of the bag bay;

at least one attachment device for connecting the frame to the golf car;

a first hitch connected to the frame, the first hitch at least partially extending downwardly from the frame section; and a second hitch connected to the frame, the second hitch at least partially extending downwardly from the frame section.

2. The mountable device as recited in claim 1 wherein the first and second hitches are movable with respect to the frame.

3. The mountable device as recited in claim 2 further comprising a first driven actuator to move the first hitch and a second driven actuator to move the second hitch.

4. The mountable device as recited in claim 1 wherein the first hitch includes one of a mount tube and a mount bracket.

5. The mountable device as recited in claim 4 wherein first hitch includes the mount bracket, the mount bracket including a claw.

6. The mountable device as recited in claim 1 further comprising a detachable golf club carrier attachable to either one of the first and second hitches, the detachable golf club carrier having at least one wheel for contacting ground, the first hitch capable of supporting the detachable golf club carrier when the wheel is off the ground.

7. The mountable device as recited in claim 6 further comprising a second detachable golf club carrier attachable to an other one of the first and second hitches.

8. The mountable device as recited in claim 6 wherein the detachable golf club carrier is rotatable with respect to the frame when in contact with the first hitch so as to lift the at least one wheel with respect to the ground.

9. The mountable device as recited in claim 6 wherein the detachable golf club carrier includes a golf bag held by a holding device.

10. The mountable device as recited in claim 1 wherein the first and second hitches at least partially extend downwardly over a bumper of the golf car.

11. The mountable device as recited in claim 1 wherein the first and second hitches are located side-by-side at the rear of the golf car.

12. The mountable device as recited in claim 1 wherein the attachment device contacts a bag holder frame of the bag bay.

13. A mountable device for a golf car comprising:

a frame for placement in a bag bay of the golf car, a frame section contacting a bottom of the bag bay;

a first hitch connected to the frame, the first hitch at least partially extending downwardly from the frame section so as to have a height similar to a bumper of the golf car; and a second hitch connected to the frame, the second hitch at least partially extending downwardly from the frame section so as to at have a height similar to the bumper.

* * * * *